Oct. 7, 1930.   I. V. MALMER   1,777,441
PARACHUTE
Filed April 9, 1928
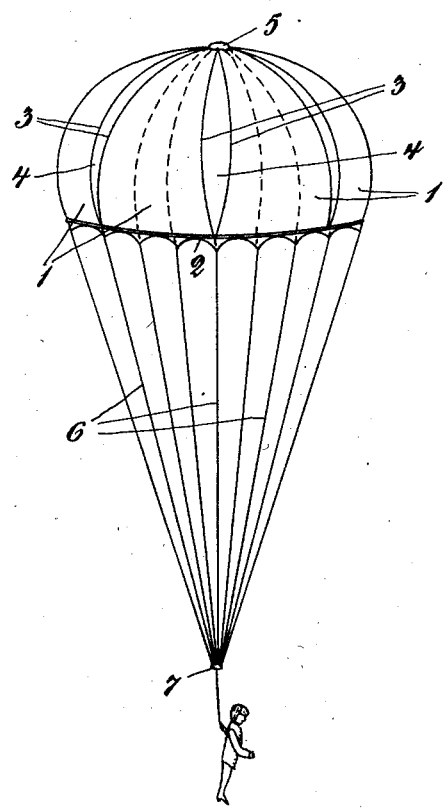
I. V. Malmer
INVENTOR Patented Oct. 7, 1930

1,777,441

UNITED STATES PATENT OFFICE

IVAR VALFRID MALMER, OF STOCKHOLM, SWEDEN

PARACHUTE

Application filed April 9, 1928, Serial No. 268,617, and in Sweden March 7, 1928.

A parachute which is caused to develop at great speed with respect to the surrounding air, is subjected, as is well known, to considerable strains both in the parachute proper and in the supporting lines and other parts pertaining to the supporting system. In addition, the braking force produced by the air resistance is transferred through the supporting lines to the body suspended in the supporting lines, said body being thus subjected to a severe shock. The air pressure on the developed parachute acts approximately at right angles to the cupola-shaped supporting surface and is, therefore, apt to cause bursting of the parachute. At very great velocities of fall it also frequently occurs that the parachute rends in one or more places when developing. These rends extend substantially in a radial direction from the apex of the parachute toward the base thereof, which shows that the tension in the fabric of the parachute is greatest in a direction at right angles to the generatrixes of the cupola-shaped supporting surface.

The present invention has for its object to eliminate the risk of the parachute bursting at too great a speed and at the same time to lessen the shock produced in the development of the parachute and transferred to the suspended body. To this end, the parachute according to the invention is provided with a number of cuts extending from the apex toward the base, substantially in a radial direction, said cuts forming slits in the developed state of the parachute which slits are adapted to let through the air. Preferably, the parachute consists of a number of sector-shaped or triangular sections united with one another at the apex and the base of the cupola, so that slits are formed between the radial edges of adjacent sections.

It has been found by experience that the rate of fall of a parachute constructed in this manner is but little greater than that of a similar undivided parachute. The cuts have the advantage, however, that bursting of the parachute is prevented and that the shock at the development is considerably reduced, inasmuch as it is then possible for the parachute to assume a more bulged shape, the slits being thus caused to open and to let through a larger quantity of air.

The invention is illustrated in the accompanying drawing which shows a parachute according to the invention in its developed state. The parachute proper consists of a number of substantially sector-shaped or triangular sections 1 which are kept together at their base edges by means of a reinforcing girdle 2 extending about the base, said girdle consisting, for instance, of a strong hem or of bands, lines or the like secured to the fabric of the parachute. At the apex, the said sections are likewise connected with each other, whereas the radial edges 3 are free so that they may form open slits 4 between them. If the parachute is provided with a hole at the apex, as will be found suitable, said hole is surrounded by a strong hem or a reinforcing band 5. The edges of the sector-shaped sections forming the slits are also reinforced by hems or by lines or bands secured to the fabric. A suitable method of making this reinforcement is to attach a line in an edge hem of the fabric, in direct or indirect connection with a supporting line 6 extending from the parachute at the lower end of the corresponding slit. Otherwise, any required reinforcement in the edges and the corners of the several sections may be made in different ways.

The provision of the slits or cuts 4 results in that the risk of the parachute bursting in the manner previously described is eliminated. By dividing the parachute into a number of sections which are relatively free with respect to each other, the strains in the fabric in a direction from the apex to the base of the parachute are also reduced, depending on the fact that each section is permitted to bulge out to a greater extent than otherwise possible along the lateral edges, thus lessening the stretching action in the fabric, and also depending on the fact that the load on the parachute, counted per unit of its area, will be less, in that the air is permitted to flow through the slits.

The circumstance that the air is permitted at the development of the parachute to flow through the slits, has a smoothing effect on the braking action and thus reduces the shock which is transferred onto the body suspended in the parachute. In this respect, the parachute acts automatically in a certain manner, inasmuch as the same assumes a more bulged shape at the beginning of the development, which bulged shape makes the slits wider, the parachute then expanding by degrees while the width of the slits is being reduced. After the constant rate of fall has been attained, the air pressure on the parachute will be comparatively small with the result that the slits are brought together so that the rate of fall will hardly be greater than in a parachute of the same size having no slits.

In certain methods of packing the parachute into a casing it is conceivable that the parachute may obtain, through the slits, a lessened tendency to develop when released from the casing. In order to ensure development in such cases, a number of different arrangements may be resorted to. One method is to sew the two edges of the same slit together, at certain intervals, by means of a thread sufficiently strong to keep the slit together during the development, the said thread being so weak, however, that the stitches are caused to break when the parachute develops to its full extent. Another method is to cover the slit by a strip of fabric of a lesser strength than that of the parachute fabric proper, said additional strip of fabric being sewn along the edges of the slits, and being adapted to break as soon as the load on the parachute reaches a non-desirable value. Still another method is to keep the sections together by means of resilient bands or the like adapted to unite the opposed lateral edges of adjacent sections.

Instead of using breakable strips or resilient bands in the manner just described the adjacent sections may be kept together by means of strips of fabric which are long enough to allow the slits to open freely without being themselves torn off said strips serving chiefly to catch the air in order to increase the tendency of the parachute to develop. Such strips may be provided across the slits at some points or only at the middle part thereof leaving free openings for the air at the other parts of the slits.

The parachute may be provided with a central line in a manner known per se, said central line uniting the apex of the parachute with the lower connecting point 7 of the supporting lines, the length of said central line being so adapted that the apex will in the act of development be kept approximately at that distance from the lower connecting point of the supporting lines which is the normal one during the fall. Heretofore, this line has been made use of to facilitate development of the parachute, but in the present parachute construction it entails the special effect that the sections are compelled at the beginning of the development to assume a shape more bulged than otherwise, so that the slits are expanded and causing a smooth braking action.

Obviously, the result aimed at with the invention can also be attained, for instance, if the slits terminate at a certain distance from the base or apex of the parachute, or if they are interrupted, in a place less exposed to the more dangerous strains, by a connection between the sections extending transversely over the slits. Moreover, the principle of the invention is independent of the geometrical shape of the parachute in its entirety. Thus, for instance, the parachute may be plane or bulged in itself. Furthermore, the parachute may be such as to form a number of cupolas in its developed state. In the latter case, the arrangement above described may be applied to each separate cupola per se.

I claim:

1. A parachute having a body portion of flexible material composed of a number of substantially sector-shaped or triangular sections united with each other at the apex and the base of the parachute, so as to allow open slits to be formed between their radial edges in the act of development of the parachute, said sections being kept together at their base edges by means of a reinforcing girdle extending along the base edges about the parachute.

2. A parachute having a body portion of flexible material composed of a number of substantially sector-shaped or triangular sections united with each other at the apex and the base of the parachute, so as to allow open slits to be formed between their radial edges in the act of development of the parachute, said sections being provided with reinforcements at their radial edges, consisting of bands or lines connected to the supporting lines of the parachute.

3. A parachute of the type forming a plurality of cupola-shaped body portions in the developed state of the parachute, each one of these body portions being composed of a number of substantially sector-shaped sections united with each other at the apex and the base of the body portion so as to allow open slits to be formed between their radial edges in the act of development of the parachute.

4. A parachute of flexible material and in the shape of a cupola when extended said parachute having in its top surface portion a number of slits extending from the apex of the cupola downwardly, the adjacent edges on the sides of the slits being flexible and permanently held in place only at the ends of the slits to allow said edges to separate and open the slits during the fall of the parachute.

5. A parachute having a body portion of flexible material composed of a number of substantially sector-shaped or triangular sections united with each other at the apex and the base of the parachute, so as to allow open slits to be formed between their radial edges in the act of development of the parachute.

In testimony whereof I affix my signature.

IVAR VALFRID MALMER.